May 8, 1934.    J. O. NAUCLER ET AL    1,958,383
METHOD AND APPARATUS FOR OBTAINING INTIMATE
CONTACT BETWEEN A GAS AND LIQUID
Filed Sept. 23, 1933    3 Sheets-Sheet 1

Inventors
Johan Olof Naucler
Sven Harald Ledin

By Cameron, Kerkam + Sutton
Attorneys

May 8, 1934.   J. O. NAUCLER ET AL   1,958,383
METHOD AND APPARATUS FOR OBTAINING INTIMATE
CONTACT BETWEEN A GAS AND LIQUID
Filed Sept. 23, 1933   3 Sheets-Sheet 2

Inventors
Johan Olof Naucler
Sven Harald Ledin
By Cameron, Kerkam & Sutton
Attorneys

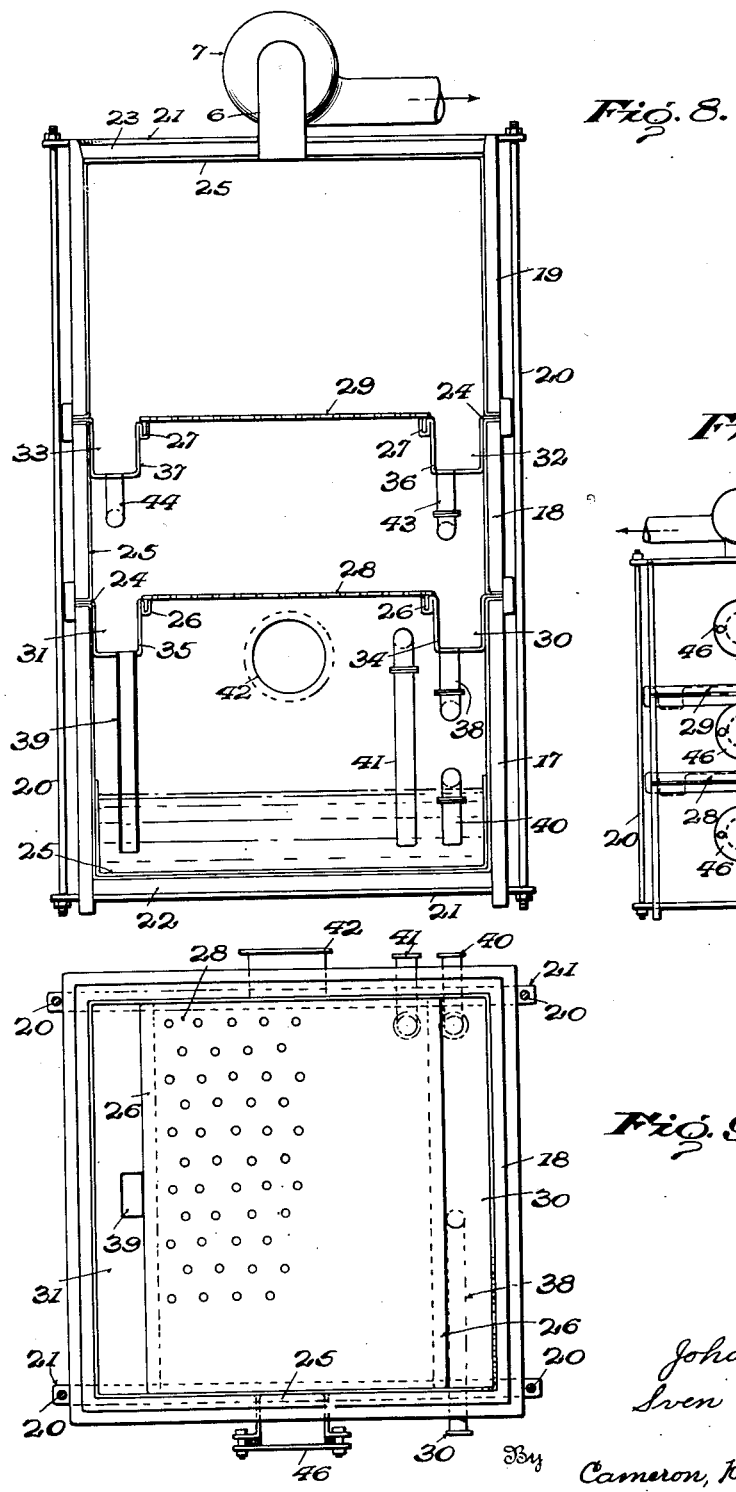

Patented May 8, 1934

1,958,383

UNITED STATES PATENT OFFICE 1,958,383

METHOD AND APPARATUS FOR OBTAINING INTIMATE CONTACT BETWEEN A GAS AND LIQUID

Johan Olof Naucler and Sven Harald Ledin, Stockholm, Sweden, assignors to Industrikemisha Aktiebolaget, Stockholm, Sweden, a joint-stock company of Sweden Application September 23, 1933, Serial No. 690,710
In Germany November 15, 1927

16 Claims. (Cl. 261—122)

This invention relates to a method and apparatus for obtaining intimate contact between gaseous and liquid mediums, as for example in processes in volving evaporation, saturation, absorption, distillation, edulcoration, heat transference and the like. The invention may be applied to a great number of uses; for example, to the evaporation of waste sulphite liquor or black liquor, the washing of gases from pyrite burners, the removal of $SO_3$ from gases in the preparation of the cooking liquor used in sulphide cellulose manufacturing, the washing of waste gases from soda melting furnaces in the manufacture of sulphate cellulose, the washing of waste gases from Kessler evaporators in order to separate out sulphuric acid therefrom, the removal of malodorous substances from gases by absorption, the cooling of gases, the condensation of vapors, the interaction of gases and liquids for heat transference and for rectifying and purifying purposes, the effecting of various chemical reactions, etc.

The primary object of the present invention is to provide a method and apparatus of the type characterized which assures a prolonged and intimate contact between relatively small quantities of the gaseous and liquid mediums so as to accomplish efficiently the purposes for which the liquid and gaseous mediums are brought into contact.

Another object of this invention is to provide a method and apparatus of the type characterized wherein the passage of the gaseous medium through the liquid medium is so controlled as to produce a relatively long column of bubbles, thereby affording a contact of prolonged duration between the gaseous and liquid mediums forming the bubbles.

Another object of this invention is to provide a method and apparatus of the type characterized wherein the conditions of effecting the contact between the gaseous and liquid mediums are so regulated as to produce a bubble column composed of bubbles of substantially uniform size and distribution and preferably polyhedral in structure.

Another object of this invention is to provide a method and apparatus of the type characterized wherein the liquid medium is also caused to descend through the bubble column after the bubbles have burst.

Another object of this invention is to provide a method of effecting intimate contact between gaseous and liquid mediums which effects the foregoing objects and results in a highly satisfactory, economical and efficient carrying out of the purposes for which the gaseous and liquid mediums are brought into contact.

Another object of this invention is to provide apparatus of improved construction and efficiency for carrying out the method of the present invention.

Other objects will appear as the description of the invention proceeds.

In accordance with the present invention, the conditions for establishing and maintaining the bubble column are so related and regulated that by passing the gaseous medium at suitable velocity through a relatively thin layer of the liquid medium, a relatively high column of bubbles is obtained, thereby securing a prolonged contact between each relatively small quantity of gaseous and liquid mediums forming a bubble. By preference said conditions are so related and regulated that the bubble column is composed of bubbles of substantially uniform size and distributed with substantial uniformity throughout the cross section of the column, said bubbles preferably being also of polyhedron shape. Investigation has demonstrated that by employing a bubble column of this character a very considerable improvement is obtainable in the efficiency with which are accomplished the purposes for which the gaseous and liquid mediums are brought into contact. While not making the present invention dependent upon the accuracy of the following theoretical explanation, the causes of the improvement are believed to be due to the following technical effects:—

A bubble column produced in conformity with the present invention is substantially free from voids or channels between the bubbles whereby the gas can avoid proper and intimate contact with the liquid and wherein there would be an absence of or reduction in the desired interaction, whether physical or chemical, between the gas and the liquid.

The polyhedron form of bubble results in maximum effect as to surface contact, as between gas and liquid, for a given volume of bubbles. Such polyhedron bubbles, as a rule, have substantially plane limiting surfaces meeting at angles of 120° and are of substantially uniform size. Hence large surface contact, as compared to the volume, exists between the film of each bubble and its contained gas.

Owing to the regularity of the component bubbles, the ascent of the bubbles through the column proceeds with substantial uniformity throughout the cross section of the column, without local turbulence or disturbing tortuosity in the paths of the bubbles. Hence the bubbles are as a rule in a constant movement toward the top of the layer, and bubbles which have travelled through the same distance will have approximately the same velocity, and a substantial uniformity in the interaction between the gaseous and liquid mediums will exist throughout the cross section of the column.

When, as preferred, the liquid released by the bursting bubbles returns through the bubble column, the downward flow through the column of the returning liquid proceeds evenly throughout the cross section of the column, with regularly distributed contact thereof with the plane walls of the ascending stream of bubbles. Hence the intervention of films of liquid of excessive thickness between adjacent bubbles, tending to interfere with effective or uniform interaction between the gas and liquid mediums, is substantially prevented.

The substantial continuity of flow and uniform distribution of equal-sized bubbles enhances the desired action between the gaseous and liquid mediums, while the bubbles bursting at or adjacent the top of the column cause the liquid thereof to move back downwardly which affords particularly favorable conditions for the carrying out of the interaction between the gaseous and liquid mediums.

A further advantage of using a regular column of equal-sized polyhedron shaped bubbles is that it is unnecessary to provide filling bodies of the character, for example, of "Raschig rings".

By suitably determining the relationship between the various factors which enter into the determination of the size and character of bubbles it is possible to obtain bubbles of such size and shape and a column of such height that the contact between the gaseous and liquid mediums becomes very effective to produce the results sought in the bringing of these mediums into contact. It will at once be apparent that these factors will vary considerably with the nature of the various gaseous and liquid mediums brought into contact and the nature and extent of the interaction to be effected between said mediums, but by suitably predetermining the thickness of the liquid layer subjected to the gas, the velocity of the gas, the temperature, and other factors involved, as hereafter explained in detail, it is possible to obtain a bubble column that effects the desired interaction between the gaseous and liquid mediums with relatively great efficiency. While the present invention contemplates that the described character of bubble column is to be secured and maintained in any suitable way, the desired result appears to be dependent upon maintaining certain definite relationships between certain factors including the velocity of the gas, the viscosity of the gas, the size and shape of the apertures in the plate, etc.

The investigations of Reynolds concerning turbulent and laminated streaming in tubes has resulted in a dimensionless hydrodynamic quantity that is known as the "Reynolds' number", which is a quotient obtained by dividing the product of the gas velocity and the smallest dimension of the passage by the kinematic viscosity of the gas going through said passage, the magnitude of the quotient of course depending on the units chosen for the individual factors. Investigation in connection with the present invention has established that the described character of bubble column can be obtained if the Reynolds' number (calculated by multiplying the gas velocity, in centimeters per second, by the smallest dimension of the aperture, in centimeters, and dividing by the value of the kinematic viscosity of the gas, in square centimeters per second) is less than 3,500. The velocity is understood to be the average velocity of the gas in the aperture, that is to say, the velocity obtained by dividing the volume of gas flowing per unit of time (cubic centimeters per second) by the face area of the aperture (in square centimeters). The smallest dimension of the aperture is taken as the smallest free opening thereof; the diameter for a circular aperture, the side for a square aperture, the width for a slot-like aperture, the smallest axis for an elliptical aperture, etc. If desired, instead of calculating the Reynolds' number by using the kinematic viscosity of the gas, it may be calculated by using the absolute viscosity, but in that event, due regard must be paid to the specific weight of the gas inasmuch as the kinematic viscosity is known to be equal to its absolute viscosity divided by its specific weight. The kinematic viscosity is preferably used because it can be obtained directly by a number of standard methods for determining viscosity.

Experience has also shown that the most satisfactory results are frequently obtained when the streaming condition of the gas through the apertures of the perforated plate are such that if the streaming had an opportunity to stabilize, a laminary or non-turbulent stream would set in, which would be the case if the calculated Reynolds' number is less than 2,000, and preferably between 1,700 and 1,000.

While investigation has seemed to indicate that the best method of determining the conditions which should exist in order to obtain the desired character of bubble column, as heretofore set out, is that using the number known as the Reynolds' number, and which name will hereinafter be used for simplicity for reference to the quotient obtained as above explained, it is to be expressly understood that the present invention is not necessarily restricted to the use of the Reynolds' number for so obtaining the desired condition, as the invention in its broader aspects is intended to embrace the generating and maintaining of the bubble column of the character heretofore explained in any suitable way. The invention will be further explained, however, by reference to the Reynold's number as the now preferred procedure by which to correlate the controlling conditions.

If the stability of the bubbles generated is inadequate to maintain a sufficiently high column, as herein explained, such stability may be improved by addition to the liquid of a suitable substance, such, for example, as soap, resin, saponine or the like, to increase the surface tension. If it is not considered necessary or desirable that the liquid return through the bubble column, the height thereof may, if desired, be regulated by means of a separator for the bubbles arranged in the path of the rising bubbles. Also the gas leaving the bubble column may, if desired, be passed through a spray separator.

As an example to illustrate the application of the method of the invention, the removal of small quantities of sulphuretted hydrogen ($SH_2$) from air by absorption in water, admixed with alkali if desired, as for instance in the purification of the atmosphere of an artificial silk factory, may be selected. In this case the air will be of room temperature (for example, 20° C.) and should be purified at atmospheric pressure, if possible. At 20° C. and a pressure of 1 atmosphere, the air, according to Landolt-Bornstein, for example, has an absolute viscosity of $1790 \times 10^{-7}$ gram-centimeters per second and its specific weight is $1119 \times 10^{-3}$ grams per cubic centimeter. Consequently the kinematic viscosity will be the quotient of the two or .1505 square centimeters per second.

Assume a perforated plate provided with circular apertures having a diameter of .35 cm. and a pitch of 1.5 cm., which has been found suitable for this use, the apertures being arranged in diagonal rows. With this arrangement of apertures, the lines connecting each pair of apertures in one transverse row with an intermediate aperture in the next transverse row form an equilateral triangle. As all of the angles of said triangle are 60° and as each cuts a 60° sector from one of the three connected apertures, the total extent of the apertures embraced in each such triangle is equal to 180° of center angle of each aperture. The area of the aforesaid triangle is $$\left(\frac{1.5}{2}\right)^2 \sqrt{3} = .975 \text{ sq. cm.}$$

As this area belongs to half an aperture, a whole aperture corresponds to 1.950 sq. cm. of area. For unit area of a square meter there should then be $$\frac{10,000}{1,950} = 5,113 \text{ apertures.}$$

The area of each aperture is of course $$\pi \times \left(\frac{3.5}{2}\right)^2 = .096 \text{ sq. cm.}$$

As in conformity with the present invention the Reynolds' number should be below 3,500, the limit condition can be determined by the equation $$V \times .35 \div .1505 = 3,500,$$

giving $V = 1505$ cm. per sec. In other words, the desired effect according to the invention will be obtained if the difference in pressure between the opposite sides of the perforated plate is such that the volume of gas flow gives an average velocity in each aperture below 1,505 centimeters per second.

The quantity of gas passing through one hole per minute is $60 \times .096 \times 1505 = 8.650$ cubic centimeters per minute, and the volume flowing through 5,113 holes is 44.3 cubic meters per minute. Knowing the total gas quantity to be treated, the minimum area for the perforated plate can be calculated so that the method may be continuous in operation.

In order to pass the gas through the apertures and the liquid layer thereon, a predetermined pressure difference between above and below the perforated plate is necessary, depending upon the surface tension of the liquid, the throttling effect of the apertures, and the pressure of the liquid layer. The throttling effect depends on the gas velocity. A liquid layer on the order of one centimeter in thickness has been found suitable, and therefore a pressure of the liquid on the perforated plate of 60 kg. per square meter may be assumed. A calculation based on well known rules will give a pressure of about 120 mm. of water column as that required to pass the gas through the liquid at the desired rate.

The quantity of liquid flowing over the perforated plate per unit of time, which may be regulated by a suitable valve, depends upon the degree of saturation desired. Assuming a liquid velocity of two meters per minute to obtain the desired concentration, the width of the strainer plate can be calculated, and knowing the area as above calculated, its length can likewise be calculated.

Under the foregoing provisions the height of the bubble column will grow to about 400 mm., and if the liquid is to return through the bubble column, the gas outlet should therefore be arranged more than 400 mm. above the perforated plate, for example, 600 mm. as in the apparatus to be hereinafter described.

The size of the bubbles will vary from case to case, from 0.1 to 5.0 cubic centimeters in volume per bubble, depending on the gaseous and liquid mediums being used and the interaction being effected. In the specific case being described, a suitable size for the bubbles is 0.5 to 1.5 cubic centimeters.

The distance between the gas inlet and the perforated plate must be large enough to permit a good distribution of the gas. Therefore, the greater the capacity of the apparatus, the larger the said distance should be. Where the area of the gas pipe is such that the gas velocity therein is lower than 7 meters per second, the said distance may suitably be equal to twice the diameter of the gas inlet.

As above pointed out, the process may frequently be best carried out if the calculated Reynolds' number lies within the range which will represent laminary streaming, i. e., between 1,700 and 1,000 with the units above employed. Under the above assumption of facts, the gas velocity will then lie between 730 and 430 centimeters per second.

If the velocity of the gas in the case of chemical reactions be increased so that the Reynolds' number exceeds 3500, the efficiency of the process will be reduced to an extent which is not counterbalanced by the increase of capacity which will be the natural result of an increased gas velocity. It has thus been found that it is more advantageous in such a case to work with a lower than with a higher gas velocity.

The process as so far described may be carried out in apparatus of a wide variety of constructions. Such apparatus consists primarily of a vessel containing a perforated plate and provided with an inlet and an outlet for the liquid which is made to flow over said plate, and an inlet and outlet for the gaseous medium which is to interact with said liquid by passage through said plate and the layer of liquid thereon. Said apparatus may also be provided with any suitable means, such as a fan, pump or the like, for forcing or aiding the gaseous medium to flow through the liquid layer.

Suitable apparatus is illustrated in the accompanying drawings; but it is to be expressly understood that the drawings are for purposes of illustration only and are not to be construed as a definition of the limits of the invention, reference being had to the appended claims for that purpose.

Referring in detail to the drawings, wherein the same reference characters are employed to designate corresponding parts in the several figures:—

Fig. 8 is a vertical section, Fig. 9 a horizontal section taken just above the lower perforated plate of Fig. 8, and Fig. 10 an elevation on a smaller scale of yet another embodiment of the present invention.

Figure 1:
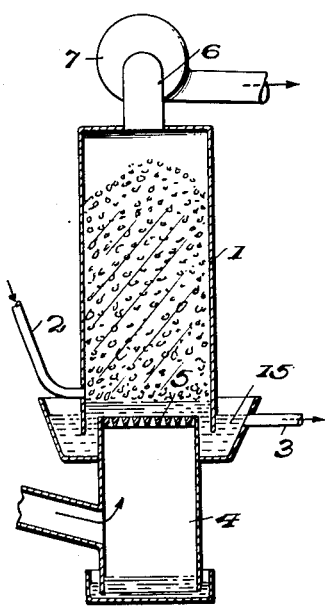
Fig. 1 shows an apparatus which may be used for carrying out the method of the present invention.

In the form shown in Fig. 1, 1 designates a vessel of any suitable size, shape, height, construction and material provided with an inlet 2 and an outlet 3 for the liquid to be treated. Connected to the bottom of said vessel 1 is an inlet 4 for the gas, and extending transversely across the passage for the flow of gas and shown as supported on the end of said inlet is a perforated plate 5. The lower end of vessel 1 is here shown as sealed from the surrounding atmosphere by means of a liquid seal 15 formed by the liquid being treated. At the upper end of the vessel 1 is an outlet 6 for the gas, and in the form shown, a fan 7 is provided in said outlet. It will be understood that suitable apparatus (not shown) may be provided for measuring pressure, temperature, liquid level, etc.

The rate of introduction of liquid through the inlet 2 being preferably such, as above explained, as to maintain a liquid layer on the perforated plate 5 of approximately 1 cm. in thickness, the gas flowing through the gas inlet 4, under suitable pressure and velocity as above explained, will pass through the apertures of said plate 5 and form a column of polyhedral shaped bubbles above said perforated plate, the height of said bubble column being relatively great as compared with the thickness of said liquid layer—on the order of 40 to 1, for example, in the example above selected for illustrating the invention. This column produces a very effective surface of contact between the relatively small quantities of gas and liquid forming the several bubbles, and as the bubbles are of substantially equal size and distributed with substantial uniformity through the cross section of the column, and as said bubbles rise in substantially continuous streams, in the nature of a laminary flow, substantially without interstitces between the various bubbles, and with a prolonged contact as well as a maximum area of contact between the liquid films and the contained gases of said bubbles, the desired interaction between the gas and liquid is obtained with maximum efficiency. When the bubbles burst upon reaching the top of the column, the gas flows through the outlet 6 with the characteristics desired from the interaction effected in the column.

In this embodiment of the invention, the height of the chamber in which the bubble column is formed is greater than that of the column that is maintained therein, and therefore all of the bubbles, as they burst, will discharge the liquid thereof downwardly into the column, and the liquid will return to the bottom of the column, flowing over and between the films of the ascending bubbles with a substantially uniform distribution through the cross section of the column as heretofore described.

Figure 2:
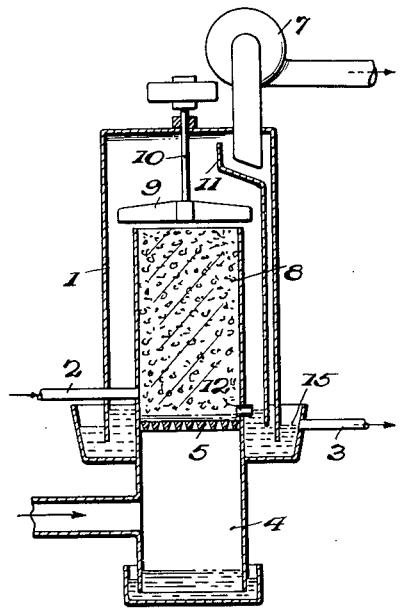
Fig. 2 shows a similar apparatus but provided with means for separating the gas bubbles from the column.

In the embodiment shown in Fig. 2, the gas intake 4 is prolonged into a cylindrical mantle 8 which extends upwardly within the vessel 1, and the perforated plate 5 forms a partition across the passage thus provided. In this embodiment, the height of the bubble column is predetermined and the return of the liquid through the bubble column is largely prevented by providing the upper end of the mantle 8 with a separator 9 in the form of rapidly rotating blades carried by a vertical shaft 10 and driven in any suitable way. The blades throw the bubbles against the lateral wall of the vessel 1 where they are burst, and the gas flows from the apparatus through the outlet 6 while the liquid flows downwardly and out through the outlet 3. The mantle 8 may be provided with a suitable aperture 12 as an outlet for the liquid flowing across the perforated plate 5 if the flow of the liquid is in excess of that which is to be converted into bubbles for the column. A baffle 11 may also be provided to separate liquid from the gas as it flows to the outlet 6. The apparatus of Fig. 2 is especially useful where the liquid is such as to provide particularly stable bubbles.

Figure 3:
Fig. 3 is an enlarged section of one form of perforated plate suitable for use in the apparatus.

Fig. 3 shows a suitable construction of the perforated plate which may be used in Figs. 1 and 2 or in other embodiments of the invention.

Figure 4:
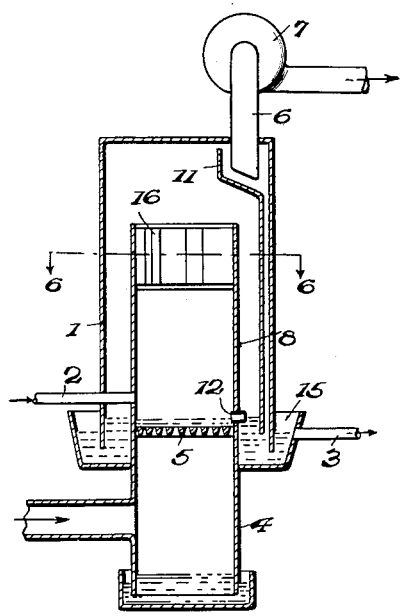
Figs. 4 and 5 are respectively a vertical section and a transverse section on line 6—6 of Fig. 4 of another embodiment.
Figure 5:
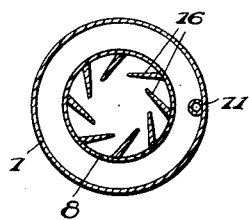

The embodiment shown in Figs. 4 and 5 is similar to that shown in Fig. 2 except with respect to the separator, here shown as a set of blades 16 by which a rotary motion may be imparted to the bubbles so that as they leave the mantle 8 they will be carried outside of the mantle 8 and the gas and liquid be separated to follow their respective paths.

Figure 6:
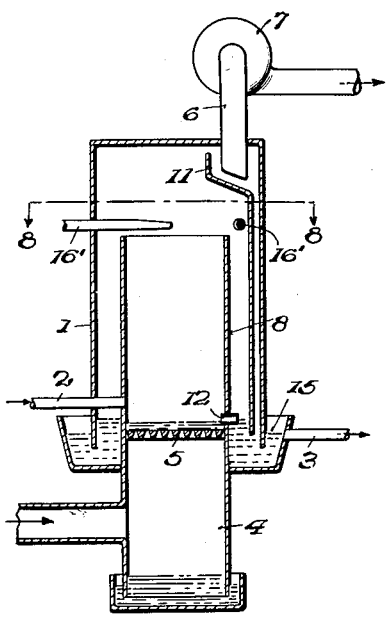
Figs. 6 and 7 are respectively a vertical section and a transverse section on line 8—8 of Fig. 6 of yet another embodiment.
Figure 7:
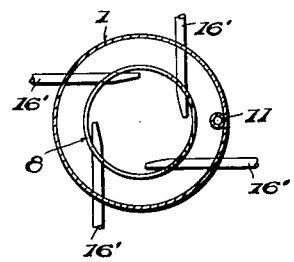

The embodiment shown in Figs. 6 and 7 is also similar to that shown in Fig. 1 except that it illustrates another form of separator wherein rotary motion is imparted to the bubbles by a number of tangentially disposed nozzles 16' through which a gas may be blown into the bubble mass. If the gas so used is heated or dry, as when using combustion gases from a furnace, a powerful evaporation at the surface of the bubbles may also be effected, thereby facilitating the bursting of the bubbles.

If desired, a plurality of apparatus can be arranged, in series with respect to the flow of the liquid, or with respect to the flow of the gases, or both, or if preferred, parallel flow can be employed. An apparatus wherein the gas and liquid are caused to interact through a plurality of bubble columns arranged in series is illustrated in Figs. 8 to 10.

In this embodiment as shown, the vessel comprises three sections or compartments 17, 18 and 19 placed one above the other and suitably secured to each other as by means of vertical bolts 20 running outside the vessel and engaging transverse members 21 bearing against the bottom plate 22 and the top plate 23 of the vessel. Lead packings 24 may be placed at the joints between the several compartments, if desired, in order to provide a tight fit. The inner faces of the walls of the compartments, including the bottom plate 22 and the top plate 23, may also be provided with lead linings 25.

Within the vessel and extending transversely thereof are two pairs of beams 26 and 27 located at different levels and serving as supports for two perforated plates 28 and 29, here shown as rectangular in shape and extending from one side wall of the vessel to the opposite one, but leaving spaces 30, 31 and 32, 33, respectively, between them and the two other side walls of the vessel. Provided in the said latter spaces are U-shaped channels 34, 35 and 36, 37 respectively, with their bottoms located below the corresponding perforated plates.

Entering the channel 34 at about the middle portion thereof is a pipe 38 for supplying liquid to said channel, and entering into the channel 35 at the opposite side of the plate 28 is a discharge pipe 39 projecting downwards into the lower compartment 17, to a suitable distance from the bottom plate 22, said compartment serving as a collecting chamber for the liquid. Provided in said chamber is also a discharge pipe 40 extending outside the vessel (see Fig. 9), said pipe serving also to form a liquid seal at its lower end which is located at a suitable distance from the bottom plate 22. Provided in the said collecting chamber 17 is also a pipe 41, the lower end of which is about at the level of the lower end of the discharge pipe 40 and which also extends outside the vessel at a point above the liquid level therein, said pipe 41 serving as a safety device, so that if, due to condensation, vacuum should occur within the vessel, air may be sucked in freely. Entering into the said compartment 17 below the plate 28 is also an inlet pipe 42 for the gaseous medium.

Similarly a supply pipe 43 for liquid enters into the upper channel 36 at the one side of the perforated plate 29, and a discharge pipe 44 for liquid enters into the channel 37 at the opposite side of the said plate and extends outside the vessel. As in the embodiments of Figs. 1 to 7, an outlet 6 for escaping gases is provided at the top of the vessel, a suction fan 7 being connected to said outlet 6. In each of the compartments 17 to 19 an inspection and cleansing opening 45, closed by a suitable lid 46, may also be provided. The operation of this apparatus is substantially the same as that described with reference to Figs. 1 to 5, excepting the double-action due to the two perforated plates, through which and the liquid layers thereon the gas passes in series. An important feature of this latter embodiment is the provision of channels running in parallel with the perforated plates and which insure that the liquid shall be equally spread over said plates to form layers of uniform thickness. This apparatus may also be combined, for example, two and two, in series, as for instance in distillation apparatus, or in parallel, or both, with respect to either the gas or the liquid.

While the structures illustrated in the drawings have been described with considerable particularity, it is to be expressly understood that the invention is not restricted thereto, as the same have been selected only as illustratory of suitable apparatus for carrying out the invention. Other forms of apparatus will now readily suggest themselves to those skilled in the art. Similarly, while in order to illustrate the application of the method of the present invention to a particular set of conditions, a particular example has been described in detail, it is to be expressly understood that the invention is not restricted thereto, as the method is applicable to a great variety of processes and conditions, and can be used wherever intimate contact is desired between a suitable liquid medium and a suitable gaseous medium, which may or may not be carrying liquid or solid matter in suspension. Moreover, while as hereinbefore pointed out, the procedure now considered to be best at the present state of knowledge for determining the relationship that should exist between the factors involved in generating and maintaining a bubble column having the desired characteristics has been specifically set forth in detail, it is to be expressly understood that the invention is not to be restricted to the use of the particularly described procedure for determining these factors, as in its broader aspects the present invention is generic to the generation and maintenance of a bubble column of the character described by whatever procedure the conditions necessary for the establishment and maintaining of such a bubble column are arrived at. Reference is made to a particular form of perforated plate in exemplifying the invention but it is to be expressly understood that the invention is not limited to the use of the particular form or character of plate so assumed. Various forms of perforated plates are known to those skilled in the art of producing foam, and any suitable form of such plate may be used without departing from the present invention provided that the critical factors involved are so related as to produce a bubble column of the character described, it being expected that the usual skill of the art will be applied in controlling other factors so as not to interfere with the method as heretofore set out. Reference is therefore to be had to the appended claims for a definition of the limits of the invention.

This application is a continuation in part of each of our prior applications Serial No. 318,905, filed November 12, 1928, and Serial No. 638,734, filed October 20, 1932.

What is claimed is:

1. In a method of bringing gaseous and liquid mediums into intimate contact, the steps of flowing the liquid medium in a relatively thin layer across a perforated member, passing the gaseous medium through said member and layer at a large number of distributed points into a confined space, the velocity and kinematic viscosity of said gas and the size of the perforations in said member being so selected that a relatively high column of bubbles is formed above said layer in said confined space, said bubbles being of substantially uniform size and distribution and disposed in layers, whereby they become of substantially polyhedral shape so that void spaces between individual bubbles are reduced to a minimum and a maximum area of surface contact between gas and liquid is obtained, and separately withdrawing the gaseous and liquid mediums released from the bursting bubbles.

2. In a method of bringing gaseous and liquid mediums into intimate contact, the steps of flowing the liquid medium in a relatively thin layer across a perforated member, passing the gaseous medium through said member and layer at a large number of distributed points under such conditions as to form above said liquid a column of bubbles which in height is many times the depth of said layer and which is composed of bubbles of substantially uniform size and distribution, returning substantially all of the liquid which is released from the bubbles bursting at the top of the column downwardly over the films of the ascending bubbles of the column, and withdrawing from the top of the column the gas released from the bursting bubbles.

3. In a method of bringing gaseous and liquid mediums into intimate contact, the steps of flowing the liquid medium in a relatively thin layer across a perforated member, passing the gaseous medium through said member and layer at a large number of distributed points into a confined space, the velocity and kinematic viscosity of said gas and the size of the perforations in said member being so selected that a relatively high column of bubbles is formed above said layer in said confined space, said bubbles being disposed in layers and of substantially uniform size and distribution, whereby void spaces between individual bubbles are reduced to a minimum and a maximum area of surface contact between gas and liquid is obtained, maintaining such a flow of gas that the bubbles tend to rise in relatively straight lines parallel to the axis of the column, and separately withdrawing the liquid and gaseous mediums released by the bursting bubbles.

4. In a method of bringing gaseous and liquid mediums into intimate contact, the steps of flowing the liquid medium in a relatively thin layer across a perforated member, passing the gaseous medium through said member and layer at a large number of distributed points under such conditions as to form above said liquid a column of bubbles composed of bubbles of substantially uniform size and distribution, maintaining such a velocity of gas that the bubbles tend to rise in lines substantially parallel to the axis of the column, returning substantially all of the liquid forming the films of said bubbles downwardly through the body of the column after bursting, and withdrawing from the top of the column the gas released by the bursting bubbles.

5. A method of treating fluid which comprises forming a relatively thin horizontal layer of liquid of substantially uniform depth, supplying liquid to said layer, withdrawing liquid from said layer to maintain the depth thereof substantially constant, and flowing a gaseous medium upwardly through said layer of liquid in a plurality of streams into a confined space, the velocity and kinematic viscosity of said gas and the size of said streams being so controlled that a column of bubbles is formed above said layer in said confined space which in height is many times the depth of the liquid layer, said bubbles being disposed in layers and of substantially uniform size and distribution, whereby void spaces between individual bubbles are reduced to a minimum and a maximum area of surface contact between gas and liquid is obtained.

6. A method of treating fluid which comprises forming a relatively thin horizontal layer of liquid of substantially uniform depth, supplying liquid to said layer, flowing a gaseous medium upwardly through said layer of liquid in a plurality of streams, maintaining such a flow of said gaseous medium as to generate and maintain a column of bubbles above said layer which in height is of the order of forty times the depth of said layer, returning substantially all of the liquid forming the films of said bubbles downwardly through the body of the column after bursting, withdrawing from the top of the column the gaseous fluid released from said bubbles, and withdrawing the spent liquid from the periphery of said layer.

7. A method of treating fluid which comprises forming a relatively thin horizontal layer of liquid of substantially uniform depth, supplying liquid to said layer, flowing a gaseous medium through said layer of liquid in a plurality of streams, so controlling the velocity and viscosity of said gas and the size of said streams as to generate and maintain a column of bubbles above said layer which in height is many times the depth of said layer, forcibly removing said bubbles from the top of said column to maintain the height thereof substantially constant, and withdrawing the gaseous fluid released by the bursting bubbles.

8. In a method of bringing gaseous and liquid mediums into intimate contact, the step of passing the gaseous medium through a layer of the liquid medium in a plurality of distributed streams into a confined space, the velocity and kinematic viscosity of the gas and the size of the streams being so selected that a column of bubbles is formed in said confined space, the bubbles of which are of substantially uniform size and distribution and disposed in layers, whereby they become of substantially polyhedral shape so that void spaces between individual bubbles are reduced to a minimum and a maximum area of surface contact between gas and liquid is obtained.

9. In a method of bringing gaseous and liquid mediums into intimate contact, the steps of passing the gaseous medium through a layer of the liquid medium in a plurality of distributed streams into a confined space, so controlling the velocity and viscosity of said gas and the size of said streams as to form above said liquid layer in said confined space a column of bubbles which are of substantially uniform size and distribution and disposed in layers, whereby they become of substantially polyhedral shape so that void spaces between individual bubbles are reduced to a minimum and a maximum area of surface contact between gas and liquid is obtained, and maintaining a substantially continuous flow of said bubbles in lines substantially parallel to the axis of the column.

10. In a method of bringing gaseous and liquid mediums into intimate contact, the steps of passing the gaseous medium through a layer of the liquid medium at distributed points therein under such conditions as to form above said liquid a column of bubbles which are of substantially uniform size and distribution and disposed in layers, whereby they become of substantially polyhedral shape so that void spaces between individual bubbles are reduced to a minimum, maintaining substantially continuous upward streams of said bubbles wherein a maximum contact between said liquid and gaseous mediums is obtained, and causing substantially all of the liquid of the bubbles after bursting to flow downwardly over the films of the ascending columns of bubbles.

11. A method of bringing gaseous and liquid mediums into intimate contact comprising passing the gaseous medium through a layer of the liquid medium at distributed points therein at such a velocity in centimeters per second that when multiplied by the smallest dimension of each aperture through which the gaseous medium is passed in centimeters and divided by the kinematic viscosity of the gaseous medium in square centimeters per second a quotient is obtained which is less than 3500.

12. A method of bringing gaseous and liquid mediums into intimate contact comprising passing the gaseous medium through a layer of the liquid medium at distributed points therein at such a velocity in centimeters per second that when multiplied by the smallest dimension of each aperture through which the gaseous medium is passed in centimters and divided by the kinematic viscosity of the gaseous medium in square centimeters per second a quotient is obtained which is between 1000 and 1700.

13. Gas and liquid contact apparatus comprising an enclosure, a horizontally disposed perforated member dividing said enclosure into a gas supply chamber and a gas-liquid contact space, means for supplying liquid to said space to form a relatively thin layer of liquid above said perforated member, means for withdrawing liquid from said layer to automatically maintain the depth thereof substantially constant, means for supplying gas under pressure to said chamber below said perforated member, means above said perforated member for so confining the bubbles formed by the passage of said gas through the liquid layer as to provide a bubble column whose height is many times the depth of said liquid layer, and means for withdrawing the gaseous medium escaping the bursting bubbles.

14. Gas and liquid contact apparatus comprising an enclosure, a horizontally disposed perforated member dividing said enclosure into a gas supply chamber and a gas-liquid contact space, means for supplying liquid to said space to form a relatively thin layer of liquid above said perforated member, means for withdrawing liquid from said layer to automatically maintain the depth thereof substantially constant, means for supplying gas under pressure to said chamber below said perforated member, means above said perforated member for so confining the bubbles formed by the passage of said gas through the liquid layer as to provide a bubble column whose height is many times the depth of said liquid layer, means for predetermining the height of said bubble column and aiding in the bursting of said bubbles, and means for withdrawing the gaseous medium escaping from the bursting bubbles.

15. Gas and liquid contact apparatus comprising an enclosure, a horizontally disposed perforated member dividing said enclosure into a gas supply chamber and a gas-liquid contact space, means for supplying liquid to said space to form a relatively thin layer of liquid above said perforated member, means for supplying gas under pressure to said chamber below said perforated member, means above said perforated member for so confining the bubbles formed by the passage of said gas through the liquid layer as to provide a bubble column whose height is many times the depth of said liquid layer, means for evaporating liquid from the top of said bubble column, and means for withdrawing the gaseous medium escaping from the bursting bubbles.

16. An apparatus for obtaining intimate contact between a gas and a liquid comprising a vessel, one or more perforated plates in said vessel, a gas inlet below and a gas outlet above said perforated plates, an inlet and an outlet for the liquid, and a pair of channels extending along opposite portions of the periphery of each perforated plate and communicating one with said liquid inlet and the other with said liquid outlet, said channels having their bottoms located below the level of the associated plate and cooperating therewith to maintain a controlled flow of liquid across the surface thereof.

JOHAN OLOF NAUCLER.
SVEN HARALD LEDIN.